Aug. 3, 1926.
C. L. IRWIN
1,595,057
DRIVING BELT CONNECTER
Filed Nov. 16, 1925
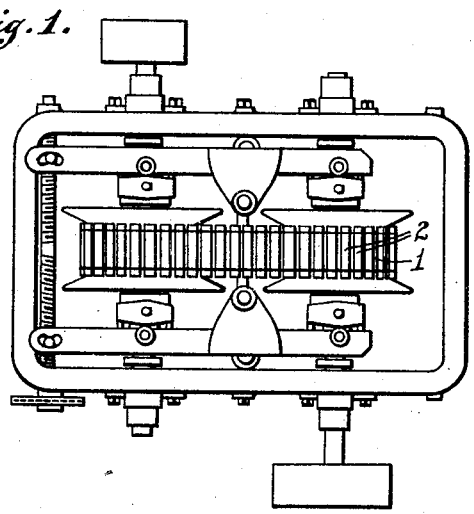
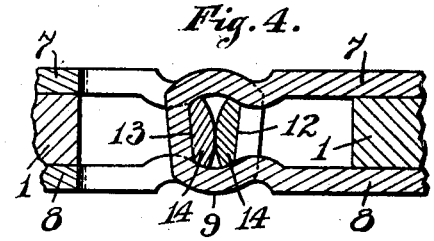
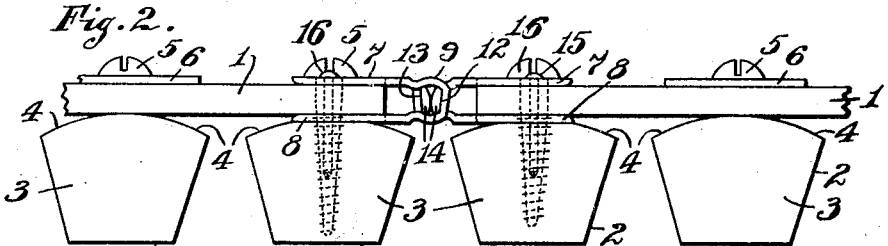
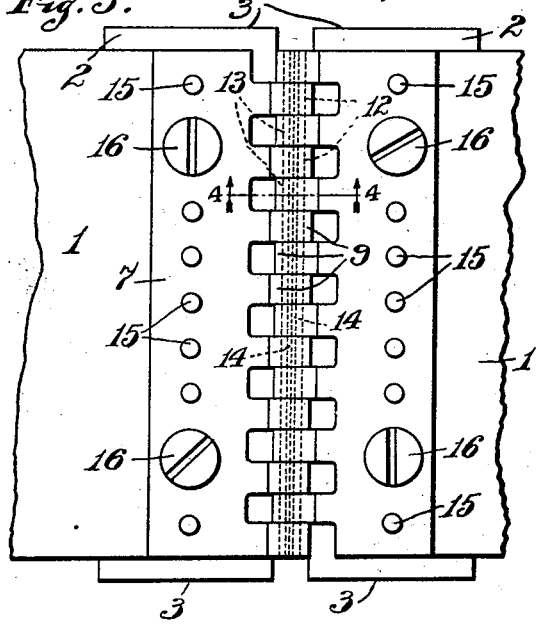
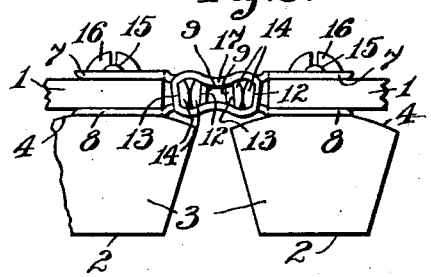
INVENTOR.
Charles L. Irwin,
BY
Hood + Hahn
ATTORNEYS Patented Aug. 3, 1926.

1,595,057

UNITED STATES PATENT OFFICE.

CHARLES L. IRWIN, OF COLUMBUS, INDIANA, ASSIGNOR TO REEVES PULLEY COMPANY, OF COLUMBUS, INDIANA, A CORPORATION OF INDIANA.

DRIVING-BELT CONNECTER.

Application filed November 16, 1925. Serial No. 69,243.

My invention relates to improvements in connecters for continuous driving belts.

In that type of speed varying transmission commonly known in the market for many years as the "Reeves" the driving force is delivered from the driving shaft to the driven shaft through the medium of two pairs of cone discs and an intermediate driving belt effective along its edges. This belt usually takes the form of an endless flexible band usually of woven fabric having secured thereto transverse bars having inclined leather faced ends.

My invention relates particularly to the connecting of the free ends of this belt to make it a continuous belt in such a manner that the ends of the belt may be connected or disconnected in assembly and disassembled in such a manner that the joint will not affect the flexibility of the belt.

For the purpose of disclosing my invention I have illustrated certain embodiments thereof in the accompanying drawings in which Fig. 1 is a plan view of the type of transmission with which my belt is particularly adapted for use;

Fig. 2 is a side elevation of a portion of my belt showing the manner of connecting the free ends of the band;

Fig. 3 is a plan view of the connection;

Fig. 4 is an enlarged section of the connection, and

Fig. 5 is an elevation showing a modified form of my connection.

In the structure illustrated the band 1 comprises a flexible band usually of woven fabric. Extending transversely of this band at suitable intervals are bars 2 having their side faces 3 inclined inwardly toward the bottom. The tops of these bars are rounded as at 4 and the bars are secured to the band by means of screws 5 passing through plates 6 on the top of the band and through the band and into the bars which are usually formed of wood. Each end of the belt is gripped between a pair of clamping plates 7 and 8 terminating at their front ends in loops 9 forming a series of interdigitating fingers. The loops 9 are mostly circular but are flattened as at 12 and 13, the construction being such that the flattened portions of the two interdigitating series of fingers will lie upon opposite sides of the common axis of the two circular sets of fingers. Two rocker pins 14, 14 are projected through the perforations with their curved faces in contact with each other and their flattened bases seated respectively upon the flattened portions 12 and 13 of the appropriate series of fingers thus forming a rocking connection between the two interdigitated series of fingers.

In assembly each free end of the belt is interposed between the clamping plates 7 and 8 and the plates and end of the belts secured to a cross bar 2 by means of brads 15 passing through the plates and belt end and into the block and by screws 16 which likewise pass through the plates and belt end and into the block. The two sets of fingers are then interdigitated and by slipping the rocking pins in position the ends of the belt are connected together.

In Fig. 5 I have illustrated a modification wherein interdigitating links 17 are interposed between the ends of the connecters, these links having the same loop formation as heretofore described in connection with the belt end connecter members.

I claim as my invention:

1. A driving belt comprising a flexible band having friction cross bars secured on one face thereof and means for connecting the free ends of said band comprising a pair of interdigitating members each comprising a pair of clamping plates between which a free end of the belt is received and terminating in interdigitating finger loops having transverse openings to receive transversely extending interlocking pins, said members being secured to a friction block by means passing through the clamping plates and the belt end and into the cross bar.

2. A driving belt comprising a flexible band having friction cross bars secured on one face thereof and means for connecting the free ends of said belt comprising a pair of connecter members each being formed from a single plate bent upon itself to provide a pair of clamping plates between which the free end of the belt is received and a series of interdigitating fingers having loops to provide transverse openings for the reception of locking pins adapted to pass transversely through said loops, said connecter members being secured to a friction block by securing members passing through the clamping plates, the belt end and into the friction block.

In witness whereof, I have hereunto set my hand at Columbus, Indiana, this 10th day of November, A. D. one thousand nine hundred and twenty five.

CHARLES L. IRWIN.